United States Patent [19]

Dzung et al.

[11] Patent Number: 5,752,205
[45] Date of Patent: May 12, 1998

[54] ADAPTABLE PORTABLE RADIO

[75] Inventors: John C. Dzung, Ft. Worth, Tex.; John F. Murray, Sunrise; Raymond P. Meenen, Boca Raton, both of Fla.; Donald F. Gatto, Coral Springs, Fla.; Faris S. Habbaba, Boca Raton, Fla.; Frank M. Tyneski, Ft. Lauderdale, Fla.

[73] Assignee: Motorola, Inc., Schaumburg, Ill.

[21] Appl. No.: 900,057

[22] Filed: Jul. 24, 1997

Related U.S. Application Data

[63] Continuation of Ser. No. 395,131, Feb. 27, 1995, abandoned.
[51] Int. Cl.[6] .................................................. H04B 1/38
[52] U.S. Cl. ............................ 455/575; 455/90; 455/572
[58] Field of Search ............................. 455/90, 95, 128, 455/344, 347, 348, 349, 351, 572, 573, 575; 379/433, 428; 340/825.44, 505; D14/138, 217, 240, 248; D13/103; 292/DIG. 38; 307/150; 320/2; 429/97, 98, 100, 123, 151, 153, 163, 177; 439/600, 929

[56] References Cited

U.S. PATENT DOCUMENTS 4,578,628  3/1986  Siwiak ........................... 455/89
4,829,224  5/1989  Gandelman et al. ............ 455/90
4,876,552  10/1989  Zakman ......................... 455/89
4,903,325  2/1990  Yoshitake et al. .............. 455/89
4,922,178  5/1990  Matuszewski et al. ......... 455/90
5,001,772  3/1991  Holcomb et al. ............... 455/90
5,136,229  8/1992  Galvin ............................ 455/89
5,155,860  10/1992  McClure ........................ 455/90
5,251,329  10/1993  Takagi et al. .................. 455/89
5,457,376  10/1995  Chong et al. .................. 455/572
5,479,486  12/1995  Saji ............................... 455/573
5,535,437  7/1996  Karl et al. ...................... 455/128

FOREIGN PATENT DOCUMENTS 60-160733  8/1995  Japan ........................... 455/89

OTHER PUBLICATIONS

Mitsubishi International Corporation, Portable Cellular Telephones, Jan. 1991.
FT-11R 2-m Hand-Held Paging Transceiver Manual by Yaesu.

Primary Examiner—Reinhard J. Eisenzopf
Assistant Examiner—Marsha D. Banks-Harold
Attorney, Agent, or Firm—Barbara R. Doutre

[57] ABSTRACT

A radio housing (101) includes first and second retention mechanisms (216, 218) on both its back and bottom surfaces (104, 106) for selectively retaining a variety of battery form factors and providing a variety of radio configurations.

8 Claims, 3 Drawing Sheets

ADAPTABLE PORTABLE RADIO

This is a continuation of application Ser. No. 08/395,131, filed Feb. 27, 1995 and now abandoned.

TECHNICAL FIELD

This invention relates in general to portable radios and more specifically to battery mounting techniques for portable radios.

BACKGROUND

The popularity of portable radio products has been increasing over the years. With the advances made in communications technology the overall size and weight of these portable products has decreased considerably making them more desirable to the individual consumer and consumer service markets. For example, small two way radios may be used by food servers and valet attendants in the food service industry. These individuals typically prefer a radio having a lighter more compact form factor. The smaller form factor, however, may not appeal to public service groups, such as fire rescue and police, where a larger radio with longer battery life is often desired. While different customers have very specific size and weight requirements, it would be desirable from a manufacturer's point of view to satisfy all of theses requirements using the same radio. Additionally, a radio that could be adapted into various size and weight configurations by the individual user would appeal to those working in both the public and private sector.

DETAILED DESCRIPTION OF THE PREFERRED EMBODIMENT

Battery packs are typically mounted to portable radios in one of three configurations. The first configuration uses bottom attachment where battery contacts at the bottom of the radio mate to corresponding battery contacts located on the top of a battery pack. The second configuration uses a back attachment where the battery pack mounts to contacts located on a back portion of the radio. The third configuration uses battery cell packs located within the radio and is typically used in lower power products. In the preferred embodiment of the invention there is provided a communication device, such as a portable radio, that adapts to a variety of battery form factors. The adaptable radio allows the user to choose the desired radio configuration for his or her needs.

Figure 1:
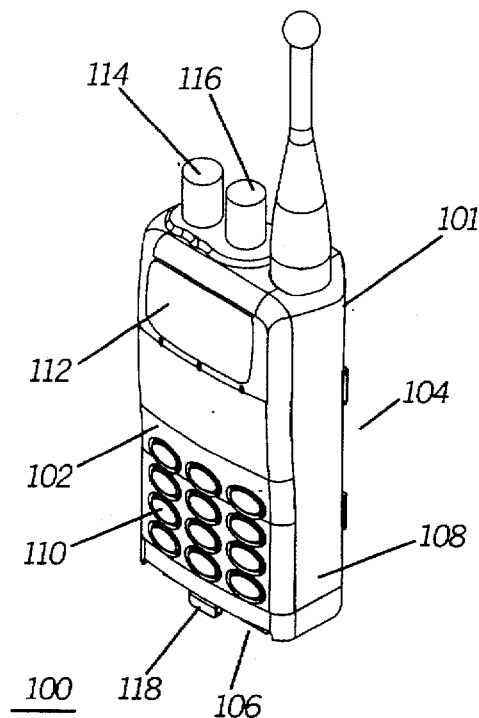
FIG. 1 is a front isometric view of a radio in accordance with the present invention.
Figure 2:
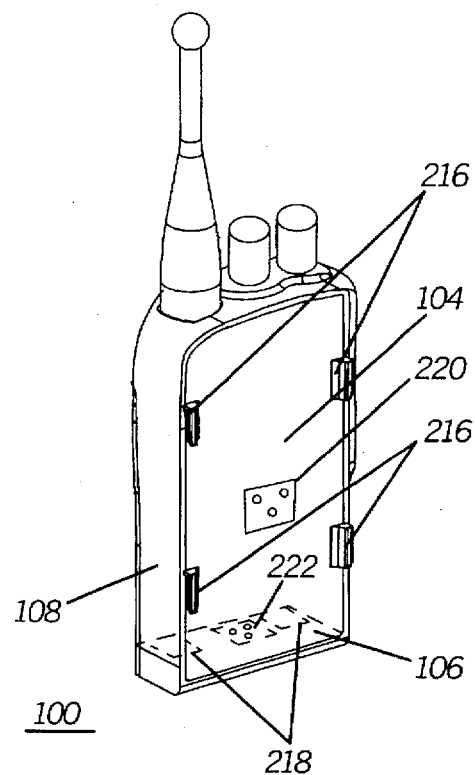
FIG. 2 is a rear isometric view of the radio of FIG. 1 in accordance with the present invention.

Referring now to FIGS. 1 and 2, there are shown front and rear isometric views of a radio 100 in accordance with the present invention. The radio 100 includes a radio housing 101 comprising front, back, bottom and side surfaces 102, 104, 106, and 108 respectively. Radio user interface features usually associated with today's portable radios, such as display 110, keypad 112, volume control 114, and channel control 116 are preferably included in the radio housing 101. The back and bottom surfaces 104, 106 of the radio housing 101 include first and second retention means 216, 218 respectively in accordance with the present invention. The first and second retention means 216, 218, also referred to as first and second latching sections, can take on the form of clips, latches, or similar retaining mechanisms. The first and second retention means 216, 218 allow the radio housing 101 to selectively receive a plurality of removable battery form factors (to be described later) to provide the end user with a variety of radio configurations. In the preferred embodiment of the invention, the first retention means 216 includes a set of four clips located on the back surface 104 of the radio housing 101, and the second retention means 218 includes a second set of clips located on the bottom surface 106.

Two sets of conductive contacts 220, 222 are preferably used to provide power interconnects to the radio 100 through the back surface 104 and the bottom surface 106 respectively. An alignment release latch 118 is preferably located on the bottom front portion of the radio housing 101.

Figure 3:
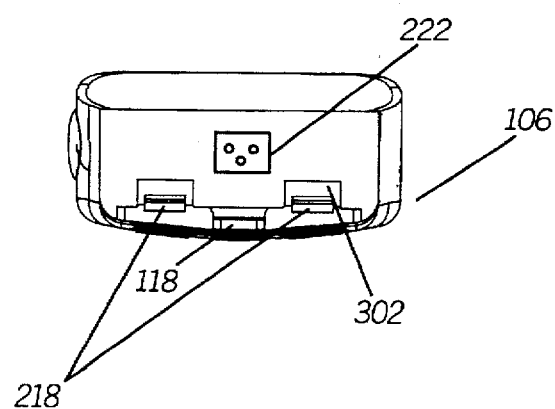
FIG. 3 is a bottom view of the radio of FIG. 1 in accordance with the invention.

A bottom view of the radio housing 101 is shown in FIG. 3 of the accompanying drawings. The bottom surface 106 is located at the extreme lower end of the radio housing 101. This view shows the bottom surface 106 including the second retention means 218, preferably consisting of two clips, the second set of conductive contacts 222, and the alignment release latch 118. The two retaining clips are preferably recessed into the bottom surface 106 of the radio housing 101 and coupled to the alignment release latch 118, such as through a common slidable plate 302 located within the radio housing 101. In the preferred embodiment of the invention, the alignment release latch 118 aids in the alignment and release of the plurality of removable battery form factors.

Figure 4:
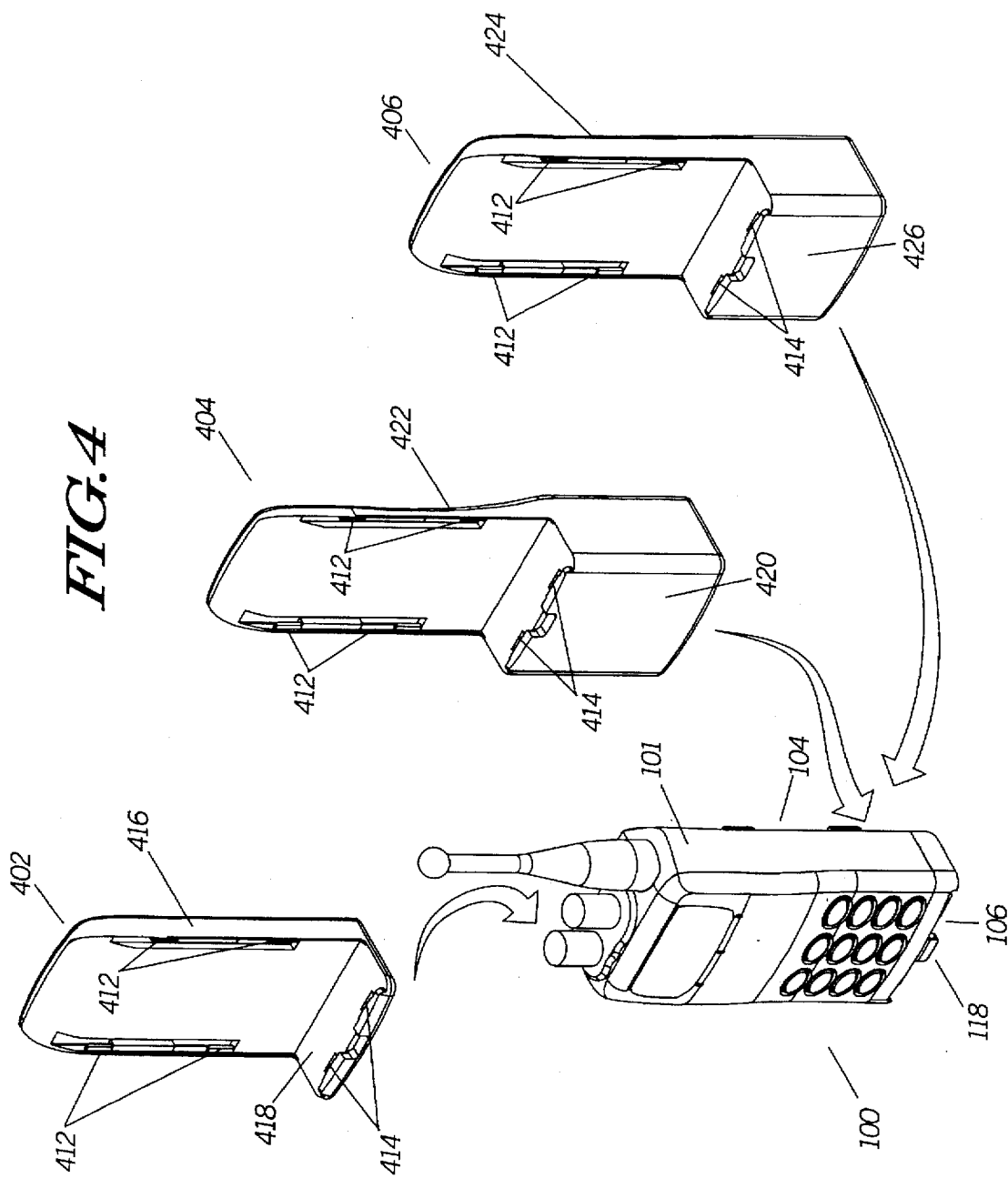
FIG. 4 is an exploded isometric view of the radio of FIG. 1 with a plurality of removable battery form factors in accordance with the invention.

Referring now to FIG. 4, there is shown the radio 100 and a plurality of batteries with individual form factors in accordance with the present invention. The adaptable radio housing 101 provides the common retention means 216, 218 on its back and bottom surfaces 104, 106 for quick and easy placement and alignment of the variety of battery form factors preferably mountable on both the bottom and the back surfaces. Each battery form factor 402, 404, and 406 includes corresponding retention means 412, 414 for mating to the radio housing 101 first and second retention means 216, 218. The first and second corresponding retention means 412, 414 are preferably made up of two sets of keyed indentations which align and mate with the retaining clips of the first and second retention means 216, 218 of the radio housing 101. The radio housing 101 selectively receives either of the battery form factors 402, 404, or 406 onto both the back and bottom surfaces 104, 106 of the radio housing. In the preferred embodiment of the invention the alignment release latch 118 is coupled to the second retention means 218 and can be pushed inward by a user to slide the clips out of the corresponding retention means 414 and thus push the battery form factor off of the radio housing 101.

In accordance with the present invention, the radio housing 101 allows for a variety of profiles and dimensions of battery form factors to be selectively mounted to achieve the desired overall radio configuration. The first battery form factor 402 includes a back portion 416 having a cell pack, and a bottom plate portion 418. When the first form factor 402 is mounted onto the radio housing 101 a radio configuration which provides a relatively short communication device that can be easily transported in a user's pocket is achieved. The second battery form factor 404 includes a cell pack in its' bottom portion 420 along with the corresponding retention means 414 and also includes a back plate 422 including the corresponding retention means 412. This second battery form factor 404 provides a longer communication device with a thinner body which some users may find easier to grasp. These first two radio configurations allow battery cell packs to be mounted on either of the back or bottom surfaces 104, 106 of the radio housing 101. The bottom and back plate portions 418, 422 of the first two battery form factors 402, 406 provide a means of covering the "unused" conductive contacts as well as providing extra support for the weight of the battery cells.

The third battery form factor 406 includes cell packs in both back and bottom portions 424, 426 respectively and includes the common corresponding retention means 412, 414. When this third battery form factor 406 is mounted to the radio housing 101, a thicker and heavier communication device is achieved. Being able to mount both the back and bottom surfaces 104, 106 of the radio housing 101 allows for larger capacity cells to be used thus providing maximum power capacity for the communication device.

Battery contacts on the battery form factors 402, 404, 406 are not shown but can be located on either of their respective back or bottom portions such that they mate with one set of the conductive contacts 220, 222 of the radio housing 101. Conductive contacts 220, 222 preferably join to a common power supply point within the radio 100. While the preferred embodiment shows two sets of conductive contacts 220, 222 on the radio housing 101, only one set of conductive contacts, either 220 or 222, would be necessary if all of the battery form factors used a one common battery contact location. While the plurality of battery form factors 402, 404, and 406 are shown as being mountable onto both the bottom and back surfaces 104, 106 of the radio housing 101, one skilled in the art can recognize that by providing two sets of battery contacts, one set on the back surface 104 and the other set on the bottom surface 106, conventional back loaded or bottom loaded battery cell packs without back or bottom plates could also operate with the radio housing 101.

By providing both back and bottom retention means within the radio housing 101, an improved overall mechanical attachment is achieved than with the single plane approaches. While the preferred embodiment of the radio housing shows and describes a first retention means comprising four clips on the back surface 104 and the second retention means comprising two clips on the bottom surface 106, one skilled in the art realizes that a different number of clips or different type of latching mechanism can be coupled to the back and bottom surfaces. Hence, the radio housing 101 can accommodate a plurality of battery form factors for mounting battery cells from either the bottom, or the back, or the bottom and the back surfaces. Again, by including a retention means on both the back and bottom surfaces of the radio housing 101 the need for any retrofitting is eliminated.

Figure 5:
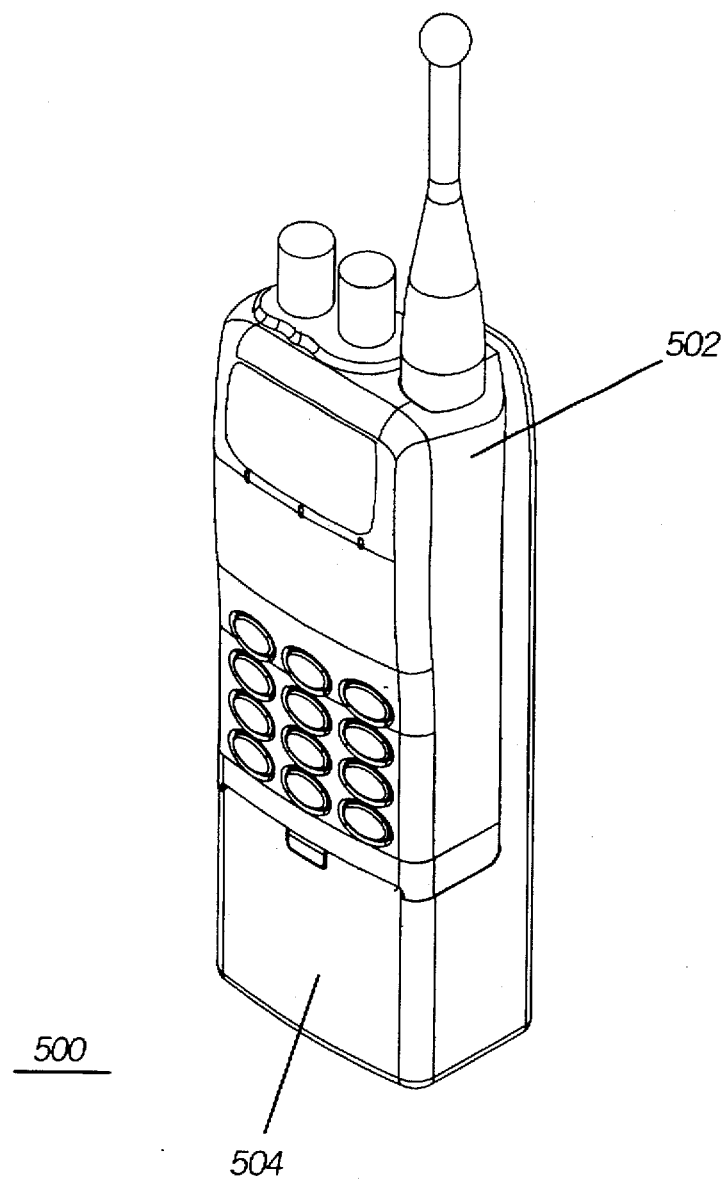
FIG. 5 is an isometric view of a communication device in accordance with the present invention.

FIG. 5 illustrates a communication device 500 in accordance with the present invention. The communication device 500 includes a housing portion 502, such as the radio housing 101, and a battery portion 504, such as the third battery form factor 406, coupled together using the retention means as described by the present invention.

Accordingly, there has been provided an adaptable radio including a retention means on both its back and bottom surfaces that can accommodate a plurality of battery form factors from both the bottom and the back surfaces of the radio housing. The adaptable radio, as described by the invention, provides a single radio unit which can achieve different configurations without field modifications or adapting kits, thus achieving considerable cost savings to the manufacturer. The end user can chose from a variety of form factors to provide an overall radio configuration that suits the user's individual needs with regards to size, weight, and battery capacity.

While the preferred embodiment is shown and described as a portable two way radio, the concept of adaptable form factors applies equally well to other portable communication devices, such as cellular telephones and other personal communicators. Numerous modifications, changes, variations, substitutions and equivalents will occur to those skilled in the art without departing from the spirit and scope of the present invention as defined by the appended claims.

What is claimed is:

1. A communication device, comprising:
   a portable radio portion including top, bottom, back, and side surfaces;
   a first set of conductive contacts coupled to the back surface of the portable radio portion;
   a second set of conductive contacts coupled to the bottom surface of the portable radio portion;
   and
   a battery portion coupled to the back and bottom surfaces of the portable radio portion, the battery portion including battery contacts for mating with both of the first and second set of conductive contacts, the communication device being adaptable in both thickness and length by the battery portion being coupled to the back and bottom surfaces of the portable radio portion.

2. A communication device as described in claim 1, wherein said portable radio portion further comprises a first retention means located on the bottom surface of the portable radio portion and the battery portion further comprises a first corresponding retention means for mating to said first retention means.

3. A communication device as described in claim 2, wherein said portable radio portion further comprises a second retention means located on the back surface of the portable radio portion, and the battery portion further comprises a second corresponding retention means for mating to said second retention means.

4. A communication device as described in claim 3, wherein the first and second retention means comprise first and second sets of clips respectively and said first and second corresponding retention means comprise first and second sets of keyed indentations for receiving said first and second sets of clips respectively.

5. A portable radio for receiving a battery including first and second battery portions, comprising:
   a radio housing including front, back, side, top, and bottom surfaces, said back surface being coupled to the first battery portion and said bottom surface being coupled to said second battery portion, the portable radio being selectively configurable in thickness and in length by varying the size of the first battery portion coupled to the back surface of the radio housing and varying the size of the second battery portion coupled to the bottom surface of the radio housing;
   a first latching section coupled to the back surface of the radio housing for retaining the first battery portion of the battery;
   a second latching section coupled to the bottom surface of the radio housing for retaining the second battery portion of the battery;

a first set of conductive contacts coupled to the back surface of the radio housing;

a second set of conductive contacts coupled to the bottom surface of the radio housing; and battery contacts located on the battery for coupling to both the first set of conductive contacts and the second set of conductive contacts.

6. A portable radio for selectively receiving one of a plurality of batteries, comprising:

a radio housing including back and bottom portions;

first and second sets of conductive contacts coupled to the back and bottom portions of the radio housing respectively;

each of said plurality of batteries mountable onto said back and bottom portions of said radio housing;

each of said plurality of batteries including battery contacts for coupling to both of said first and second sets of conductive contacts of said radio housing; and said plurality of batteries providing a plurality of radio configurations when mounted onto the back and bottom portions of said radio housing, the plurality of radio configurations providing for a portable radio which can be selectively lengthened and thickened.

7. A portable radio for selectively receiving one of a plurality of batteries as described in claim 6, further comprising a retention means for coupling the back and bottom portions of the radio housing to the selected removable battery.

8. A portable radio for selectively receiving one of a plurality of batteries as described in claim 10, further comprising:

retaining clips located on the back and bottom portions of the radio housing; and said plurality of batteries each including keyed indentations for receiving the retaining clips.

* * * * *